(12) United States Patent
Rivera et al.

(10) Patent No.: US 7,797,285 B1
(45) Date of Patent: Sep. 14, 2010

(54) METHOD AND APPARATUS FOR RESTORING BACKUP DATA TO A COMPUTER

(75) Inventors: Felix Rivera, Sanford, FL (US);
Alejandro Arellano, Orlando, FL (US);
Jose Rafael Fernandez, Orlando, FL (US)

(73) Assignee: Symantec Corporation, Mountain View, CA (US)

( * ) Notice: Subject to any disclaimer, the term of this patent is extended or adjusted under 35 U.S.C. 154(b) by 353 days.

(21) Appl. No.: 11/864,875

(22) Filed: Sep. 28, 2007

(51) Int. Cl.
*G06F 17/00* (2006.01)
(52) U.S. Cl. .................... 707/678; 707/705; 707/802; 709/217; 717/174
(58) Field of Classification Search ................ 707/609, 707/640, 674, 678, 705, 802; 709/217; 717/174
See application file for complete search history.

(56) References Cited

U.S. PATENT DOCUMENTS

2008/0016178 A1* 1/2008 Portugali .............. 709/217

OTHER PUBLICATIONS

Apple—Notebooks—Compare Models, downloaded on Jan. 11, 2008 from web site: http://store.apple.com/Catalog/US/Images/comparison_chart.html, 3 pages.
Ubuntu Geek—Tips, Howtos, Tutorials and Articles about Ubuntu Linux (Dapper—Edgy—Feisty—Gutsy), downloaded on Jan. 11, 2008 from web site: http://www.ubuntugeek.com/disk-archive-backup-and-restore-using-dar-and-kdardar-frontend.html, 21 pages.
Digital Point Forums, downloaded on Jan. 11, 2008 from web site: http://forums.digitalpoint.com/showthread.php?t=434290, vBulletin® v3.6.8, Copyright © 2000-2008, Jelsoft Enterprises Ltd., 2 pages.
Java Program, downloaded on Jan. 11, 2008 from web site: http://fisheye.codehaus.org/browse/~raw,r=18/drone/trunk/src/java/com/uwyn/drone/core/Bot.java.

* cited by examiner

*Primary Examiner*—Fred I Ehichioya
(74) *Attorney, Agent, or Firm*—Moser IP Law Group (57) ABSTRACT

Method and apparatus for restoring backup data to a computer is described. In one example, selected resources of within the backup data to be restored are specified. An installation package is generated that provides a hierarchical archive of the selected resources and is configured for execution by an operating system of the computer. The installation package is provided to the computer for execution thereon to effect a restoration of the selected resources onto the computer.

16 Claims, 5 Drawing Sheets

METHOD AND APPARATUS FOR RESTORING BACKUP DATA TO A COMPUTER

BACKGROUND OF THE INVENTION

1. Field of the Invention

The present invention relates generally to computer backup systems and software. More particularly, the present invention relates to a method and apparatus for restoring backup data to a computer.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. To mitigate the risk of losing data, a computer system may include backup software for making backup copies of data stored on various storage devices. Some types of backup involve backing up data from a source system to a remote storage server over a network. The data may be backed up initially to disk-based storage and then migrated to an archival storage, such as tape-based storage.

The traditional process by which a data backup is restored to the source system requires substantial interaction between storage devices (possibly remote over a network), backup software components, and the target system. This interaction yields the following problems: file transfer between a remote storage server and the target system becomes a likely point of failure due to increase failure opportunity in network environments. The complexity of the restore process increases if backup software components are required to be installed on the target system prior to initiating restoration. A restore process can place a significant burden on a remote storage server's resources and complicates or prohibits multiple simultaneous restores to different target systems. Accordingly, there exists a need in the art for an improved method and apparatus for restoring backup data to a computer.

SUMMARY OF THE INVENTION

Method and apparatus for restoring backup data to a computer is described. In one embodiment, selected resources of within the backup data to be restored are specified. An installation package is generated that provides a hierarchical archive of the selected resources and is configured for execution by an operating system of the computer. The installation package is provided to the computer for execution thereon to effect a restoration of the selected resources onto the computer.

Another aspect of the invention relates to backing up data from a computer. Resources on the computer to be backed up are selected. A backup job specifying an installation package medium and the selected resources is generated. The backup job is executed to form an installation package having the selected resources using an install application programming interface (API) of an operating system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
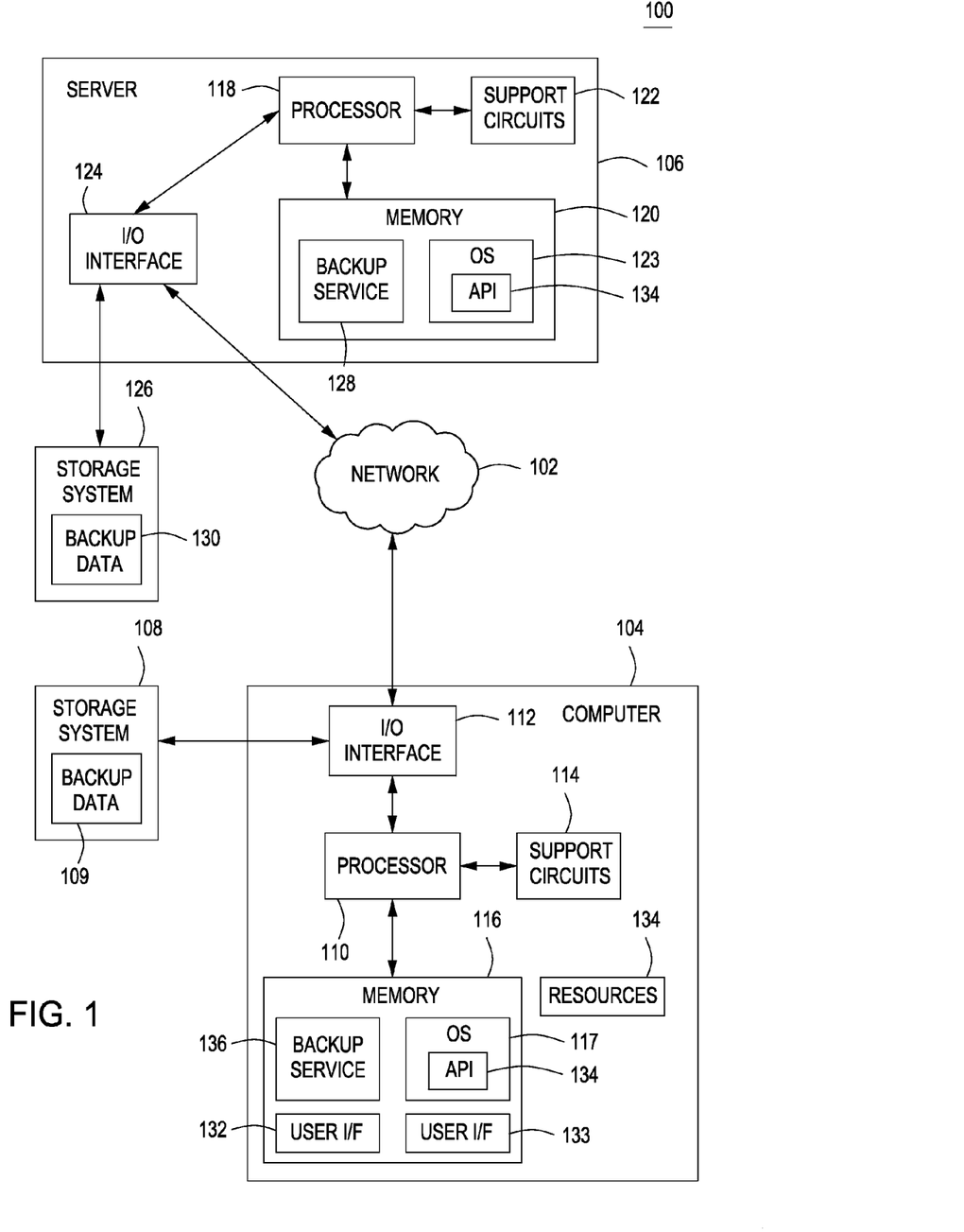
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, a computer 104, and a server 106. The network 102 comprises a communication system that connects computer systems by wire, cable, fiber optic, and/or wireless links facilitated by various types of well-known network elements, such as hubs, switches, routers, and the like. In particular, the network 102 connects the computer 104 and the server 106. The network 102 may employ various well-known protocols to communicate information. For example, the network 102 may employ internet protocol (IP), transmission control protocol (TCP), and the like for the transmission of packets. The network 102 may comprise part of a wide area network (WAN), such as the Internet, or all or part of a local area network (LAN).

The computer 104 illustratively includes a processor 110, a memory 116, various support circuits 114, an I/O interface 112. The processor 110 may include one or more microprocessors known in the art. The support circuits 114 for the processor 110 include conventional cache, power supplies, clock circuits, data registers, I/O interfaces, and the like. The I/O interface 112 may be directly coupled to the memory 116 or coupled through the processor 110. The I/O interface 112 may also be configured for communication with input devices and/or output devices, such as, network devices, various storage devices, mouse, keyboard, display, and the like (not shown). The I/O interface 112 is also coupled to the network 102. The I/O interface 112 may also be coupled to a storage system 108. The storage system 108 may include various storage devices (e.g., disc drives, tape drives, etc.). The memory 114 may include one or more of the following random access memory, read only memory, magneto-resistive read/write memory, optical read/write memory, cache memory, magnetic read/write memory, and the like, as well as signal-bearing media as described below. The computer 104 may be configured with an operating system (OS) 117, which may include OS/2, Java Virtual Machine, Linux, Solaris, Unix, HPUX, AIX, Windows, Windows Server, among other known platforms. At least a portion of the OS 117 may be disposed in the memory 117.

The server 106 illustratively includes a processor 118, a memory 120, various support circuits 122, an I/O interface 124. The processor 118 may include one or more microprocessors known in the art. The support circuits 122 for the processor 118 include conventional cache, power supplies, clock circuits, data registers, I/O interfaces, and the like. The I/O interface 124 may be directly coupled to the memory 120 or coupled through the processor 118. The I/O interface 124 is also coupled to the network 102. The I/O interface 124 may be further coupled to a storage system 126. The storage system 126 may include a plurality of storage devices (e.g., disc drives, tape drives, etc.). The memory 120 may include one or more of the following random access memory, read only memory, magneto-resistive read/write memory, optical read/write memory, cache memory, magnetic read/write memory, and the like, as well as signal-bearing media as described below. The server 106 may be configured with an operating system 123, which may include Linux, Solaris, Unix, HPUX, AIX, Windows Server, among other known platforms. At least a portion of the OS 123 may be disposed in the memory 120.

One aspect of the invention relate to backing up resources on the computer 104. The resources may include user data (e.g., user files, such as pictures, documents, etc.), application data (e.g., application files), system data (e.g., OS files), system state information (e.g., user settings, application settings, OS settings, etc.), and the like. In an embodiment, resources are backed up to an installation package. An installation package is an hierarchical archive of resources and is configured for execution by an operating system of a computer. An installation package may be generated using an installer application programming interface (API) of an operating system. An installation API of an operating system provides an engine for installation, maintenance, and removal of software managed by the operating system. The installation information, including the files to be installed, are packaged into an installation package. Exemplary installation packages are "MSI files" produced by the MICROSOFT WINDOWS Installer provided with the MICROSOFT WINDOWS operating systems. Other operating systems utilize similar installation packages as is known in the art, such as "RPM files" under the LINUX operating system.

Figure 2:
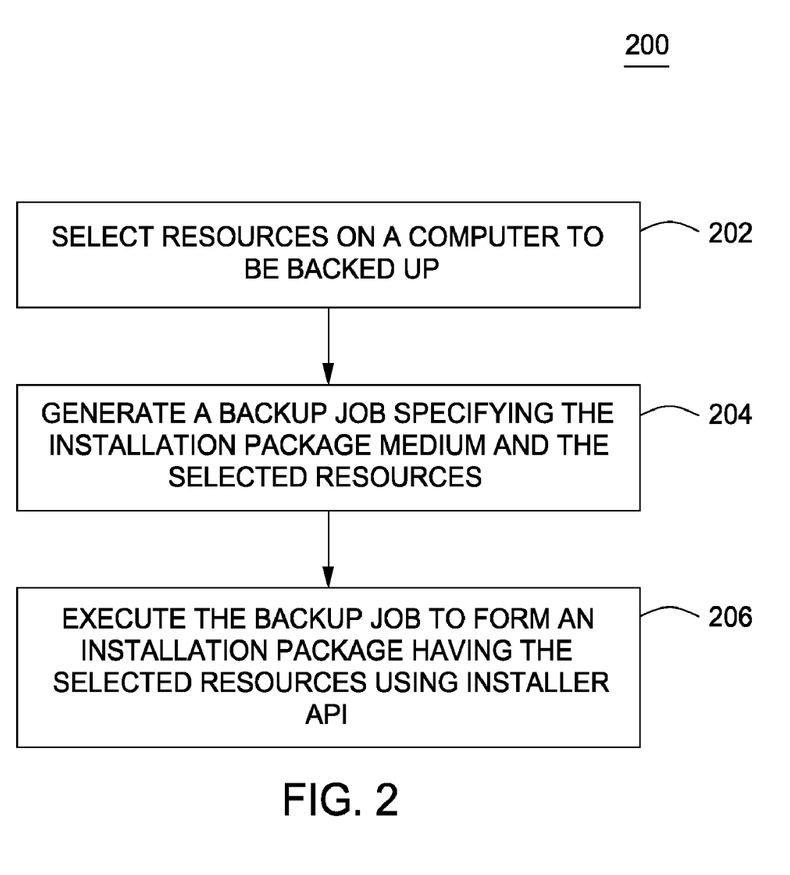
FIG. 2 is a flow diagram depicting an exemplary embodiment of a method for backing up resources on a computer in accordance with one or more aspects of the invention.

FIG. 2 is a flow diagram depicting an exemplary embodiment of a method 200 of backing up resources on a computer in accordance with one or more aspects of the invention. The method 200 may be understood with reference to the system 100 of FIG. 1. In the present example, backup data for the computer 104 is maintained by the server 106. In particular, the server 106 includes a backup service 128. The backup service 128 provides a remote backup service for the computer 104 over the network 102. For example, such a remote backup service may comprise software as a service (SaaS) backup software that is configured to serve a plurality of computers over a network.

The computer 104 may be configured with a user interface 132 to the backup service 128. The user interface 132 may be a separate component, may be part of another application, such as an Internet browser or a web service, or may be part of the OS 117. The user interface 132 allows a user of the computer 104 to initiate and/or schedule backups of target resources 134 on the computer 104.

The method 200 begins at step 202, where a user selects resources on the computer 104 to be backed up. The user may further specify a "backup to installation package" option to the backup service 128. In response, at step 204, the backup service 128 generates a backup job specifying the installation package medium and the selected resources in the backup data 130. At step 206, the backup service 128 executes the backup job to form an installation package having the selected resources using an installer API 134 in the OS 123. The installation package is in essence a archive of the backed up resources at a particular point in time. The installation package may be subsequently used to restore resources back to the computer 104 or to another computer.

Another aspect of the invention relates to restoring backup data to the computer 104. The backup data may include a copy or copies, as of some point or points in time, of various types of resources of the computer 104 (referred to as target resources), including user data (e.g., user files, such as pictures, documents, etc.), application data (e.g., application files), system data (e.g., OS files), system state information (e.g., user settings, application settings, OS settings, etc.), and the like. In some cases, the backup data includes one or more full copies of the target resources, along with one or more sets of incremental or differential changes to the target resources. In some embodiments, the computer 104 backs up target resources to the server 106 over the network 102 (remote backup). In some embodiments, the computer 104 backs up target resources to the storage system 108 (local backup). Various embodiments of restoring backup data to the computer 104 are described below.

Figure 3:
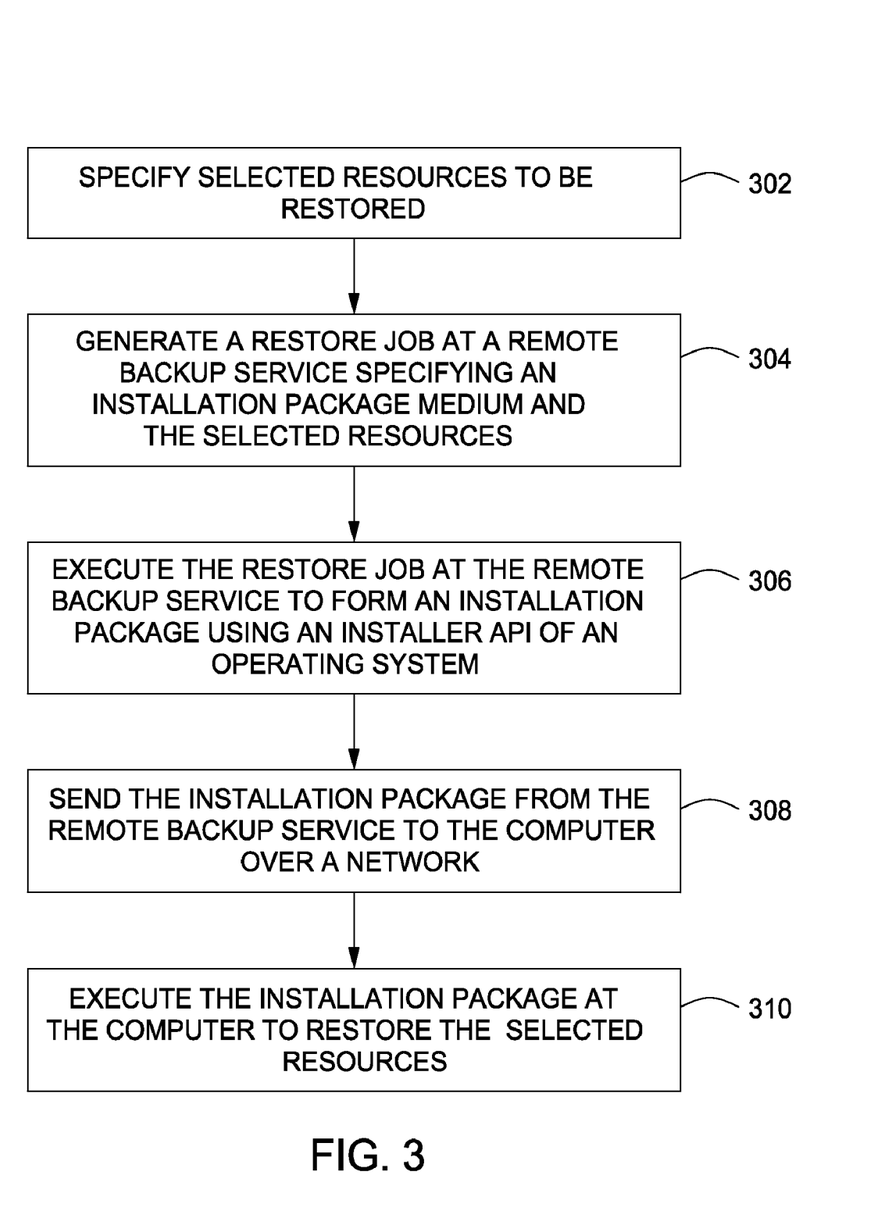
FIG. 3 is a flow diagram depicting exemplary embodiment of a method for restoring backup data to a computer in accordance with one or more aspects of the invention.

FIG. 3 is a flow diagram depicting an exemplary embodiment of a method 300 for restoring backup data to a computer in accordance with one or more aspects of the invention. The method 300 may be understood with reference to the system 100 of FIG. 1. In the present example, the backup data 130 for the computer 104 is maintained by the backup service 128 on the server 106. The backup service 128 provides a remote backup service for the computer 104 over the network 102, as described above. A user interface 133 enables the user to initiate a restoration of resources with the backup service 128.

In particular, at step 302, the user specifies selected resources on the computer 104 within the backup data 130 to be restored. Resources may be selected individually (e.g., particular files or settings), or automatically by specifying a point-in-time from which to restore all or a portion of backed up resources. The user may further specify a "restore to installation package" option to the backup service 128. In response, the backup service 128 selects a restoration medium of installation package.

At step 304, the backup service 128 generates a restore job specifying the installation package medium and the selected resources in the backup data 130. At step 306, the backup service 128 executes the restore job to form an installation package having the selected resources using an installer API 134 in the OS 123. At step 308, the backup service 128 sends the installation package to the computer 104 over the network 102. At step 310, the user may execute the installation package to restore the selected resources. Execution of the installation package is handled by an installer in the OS 117. The installer may optionally prompt the user to decide whether any files of the selected resources that are being overwritten should be backed up to an alternate location.

In this manner, selected resources that have been backed up may be restored to the computer 104 without the computer 104 having backup software installed thereon. That is, the computer 104 does not need a local backup service for restoring backup data. Rather, aspects of the invention leverage the installation API 134 already present in the OS 117 to restore the backup data. In some embodiments, the computer 104 may be configured with a local backup service 136. In such embodiments, the restoration process may proceed substantially as described above. However, the installation package received by the computer 104 may be automatically handled by the backup service 136. The backup service 136 may interact with the user or may automatically execute the installation package to restore the backup data. In any embodiments, should the restore process be interrupted (i.e., execution of the installation package is interrupted), the OS 117 may automatically perform a rollback operation. Such a rollback is supported by the API 134.

Figure 4:
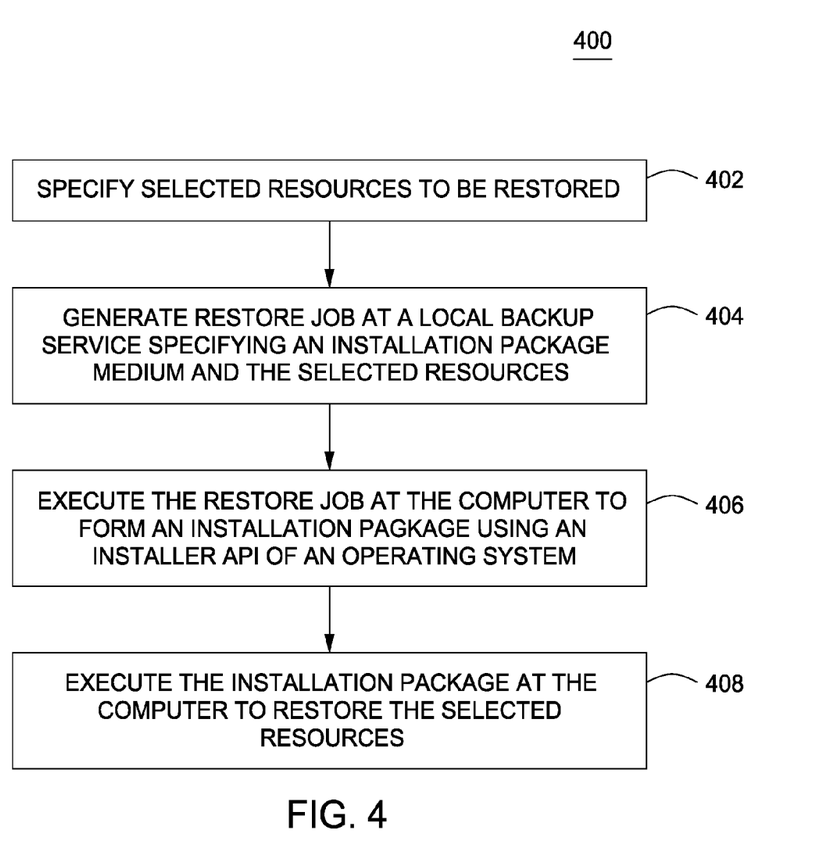
FIG. 4 is a flow diagram depicting another exemplary embodiment of a method for restoring backup data to a computer in accordance with one or more aspects of the invention.

FIG. 4 is a flow diagram depicting another exemplary embodiment of a method 400 for restoring backup data to a computer in accordance with one or more aspects of the invention. The method 400 may be understood with reference to the system 100 of FIG. 1. In the present embodiment, the computer 104 is configured with the backup service 136 that provides local backup services. The backup service 136 may cooperate with the storage system 108 to maintain backup data 109 for the computer 104. The backup service 136 enables the user to initiate a restoration of previously backed up resources.

In particular, at step 402, the user specifies selected resources on the computer 104 within the backup data 109 to be restored. Resources may be selected individually (e.g., particular files or settings), or automatically by specifying a point-in-time from which to restore all or a portion of backed up resources. The user may further specify a "restore to installation package" option to the backup service 136. In response, the backup service 136 selects a restoration medium of installation package.

At step 404, the backup service 136 generates a restore job specifying the installation package medium and the selected resources in the backup data 109. At step 406, the backup service 136 executes the restore job to form an installation package having the selected resources using an installer API 134 in the OS 117. At step 408, the user may execute the installation package to restore the selected resources. Execution of the installation package is handled by an installer in the OS 117, as described above.

Figure 5:
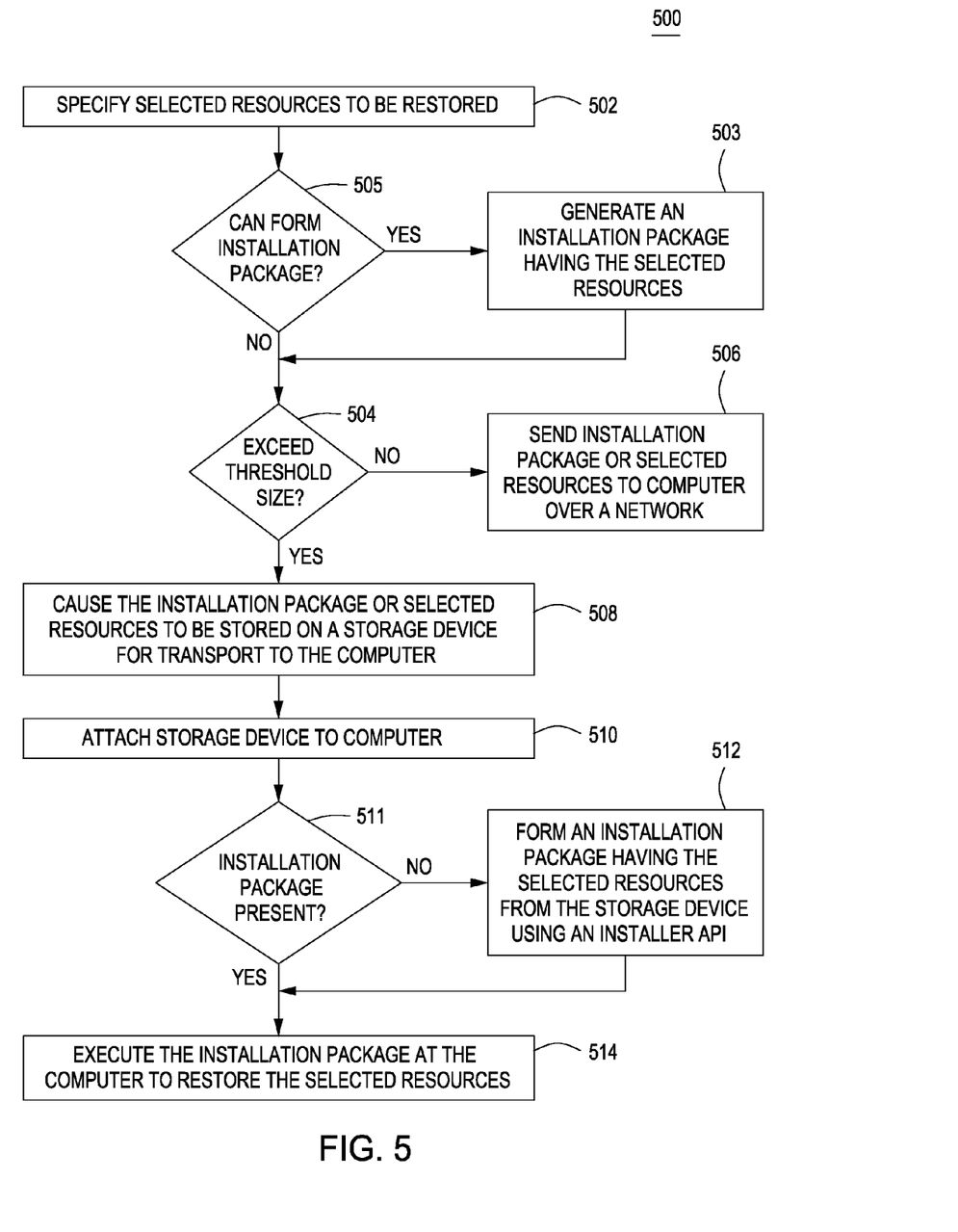
FIG. 5 is a flow diagram depicting another exemplary embodiment of a method for restoring backup data to a computer in accordance with one or more aspects of the invention.

FIG. 5 is a flow diagram depicting another exemplary embodiment of a method 500 for restoring backup data to a computer in accordance with one or more aspects of the invention. The method 500 may be understood with reference to the system 100 of FIG. 1. Similar to the method 300, the backup data 130 for the computer 104 is maintained by the backup service 128 on the server 106. The backup service 128 provides a remote backup service for the computer 104 over the network 102.

At step 502, the user specifies selected resources on the computer 104 within the backup data 130 to be restored. Resources may be selected individually (e.g., particular files or settings), or automatically by specifying a point-in-time from which to restore all or a portion of backed up resources. The user may further specify a "restore to installation package" option to the backup service 128. In response, the backup service 128 selects a restoration medium of installation package.

At step 505, a determination is made whether the backup service 128 can form an installation package. In some embodiments, the backup data from which the resources are being restored from is encrypted. For example, when the resources are backed up from the computer 104, the computer 104 encrypts the resources before sending them to a backup service. The computer 104 maintains the cryptographic keys that can be used to recover the encrypted resources. If the resources selected for restoration are encrypted, the backup service may not be able to generate an installation package using an install API. For example, some install APIs require access to the resources to form metadata as part of the installation package. Accordingly, if the selected resources are encrypted and the backup service 128 does not have access to the cryptographic keys necessary to decrypt the resources, then the backup service 128 may be incapable of forming an installation package. In such case, the method 500 proceeds to step 504. If the backup service 128 can form an installation package (either because the resources are not encrypted or because the backup service has the cryptographic keys), then the method 500 proceeds to step 503.

At step 503, the backup service 128 generates an installation package having the selected resources. The method 500 then proceeds to step 504. At step 504, a determination is made whether the installation package (if formed) or the selected resources exceeds a threshold storage size. A threshold storage size may be set to avoid sending installation packages or resources of a particular threshold size to the computer 104 over the network 102. If the installation package or resources exceeds the threshold size, the method 500 proceeds to step 508; otherwise the method proceeds to step 506. At step 506, the backup service 128 sends the installation package (if formed) or the selected resources to the computer 104 over the network 102. At step 508, the backup service 128 causes the installation package (if formed) or the selected resources to be stored on a disc drive, FLASH memory, DVD, CD, or other type of storage device for transport to the computer (referred to as the transport storage device).

At step 510, the storage device is attached to the computer 104 (e.g., via the interface 112). The storage device may be accessed via the user interface 133 or the backup service 136 (if available). At step 511, a determination is made whether the storage device includes an installation package. As described above, the backup service 128 in the server 106 may form an installation package at step 503 and the installation package may be stored on the storage device at step 508. If the storage device does not include an installation package, the method 500 proceeds to step 512. Otherwise, the method 500 proceeds to step 514.

At step 512, the computer 104 forms an installation package having the selected resources using an installer API 134 in the OS 117. The selected resources may be obtained from the storage device. If the selected resources are encrypted, the computer 104 first decrypts the selected resources using the appropriate cryptographic keys. The method 500 then proceeds to step 514. At step 514, the user may execute the installation package to restore the selected resources. Execution of the installation package is handled by an installer in the OS 117, as described above.

In any of the methods described above, execution of the installation package may be restricted for security or configurability reasons. For example, the installation package may include files of copyrighted application software. Thus, the installation package may be generated such that its execution is restricted to a particular OS and/or to a particular OS running on a particular computer. Mechanisms for identifying particular computers are well known in the art.

In the embodiments described above, a memory may store processor-executable instructions and/or data that may be executed by and/or used by a processor. These processor-executable instructions may comprise hardware, firmware, software, and the like, or some combination thereof. Modules having processor-executable instructions that are stored in a memory may include backup services, user interfaces, and the like. In other embodiments, all or a portion of each of these modules may be implemented in hardware, software, or a combination of hardware and software, including implementations using programmable logic devices (PLDs), application specific integrated circuits (ASICs), and the like. Thus, the term "module" as used herein encompasses software implementations, hardware implementations, or a combination of software and hardware implementations.

Aspects of the methods described above may be implemented as a program product for use with a computer system.

Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of restoring backup data to a computer, comprising:
    specifying selected resources within the backup data to be restored using the computer or a second computer wherein the selected resources comprise one or more backup files;
    generating an installation package using the computer or a second computer that provides a hierarchical archive of the selected resources and is configured for execution by an operating system of the computer;
    providing the installation package to the computer for execution thereon to effect a restoration of the selected resources onto the computer; and
    wherein the step of generating comprises: generating a restore job at the remote backup service, the restore job specifying a restoration medium of installation package;
    executing the restore job to form the installation package using an installer application programming interface (API) of the operating system;
    determining, at the remote backup service, that the installation package exceeds a threshold storage size;
    storing the selected resources onto a storage device configured for transport to the computer; and
    forming the installation package having the selected resources as stored on the storage device using the installer API of the operating system.

2. The method of claim 1, wherein the step of specifying comprises:
    sending a request to a remote backup service over a network, the request indicating the selected resources for restoration.

3. The method of claim 2, wherein the step of generating comprises:
    generating a restore job at the remote backup service, the restore job specifying a restoration medium of installation package; and
    executing the restore job to form the installation package using an installer application programming interface (API) of the operating system.

4. The method of claim 3, wherein the step of providing comprises:
    sending the installation package to the computer from the remote backup service over the network.

5. The method of claim 2, wherein the step of generating comprises:
    generating a restore job at the remote backup service, the restore job specifying a restoration medium of installation package;
    executing the restore job to form the installation package using an installer application programming interface (API) of the operating system;
    determining, at the remote backup service, that the installation package exceeds a threshold storage size; and
    storing the installation package onto a storage device configured for transport to the computer.

6. The method of claim 1, further comprising:
    restricting the installation package to only execute on the operating system and on the computer.

7. The method of claim 1, wherein the step of specifying comprises:
    sending a request to a local backup service executing on the computer, the request indicating the selected resources for restoration.

8. The method of claim 7, wherein the step of generating comprises:
    generating a restore job specifying a restoration medium of installation package; and
    executing the restore job to form the installation package using an installer application programming interface (API) of the operating system.

9. Apparatus for restoring backup data to a computer, comprising:
    means for specifying selected resources within the backup data to be restored wherein the selected resources comprise one or more backup files;
    means for generating an installation package that provides a hierarchical archive of the selected resources and is configured for execution by an operating system of the computer;
    means for providing the installation package to the computer for execution thereon to effect a restoration of the selected resources onto the computer; and
    wherein the means for generating comprises: means for generating a restore job at the remote backup service, the restore job specifying a restoration medium of installation package;
    means for executing the restore job to form the installation package using an installer application programming interface (API) of the operating system;
    means for determining, at the remote backup service, that the installation package exceeds a threshold storage size;
    means for storing the selected resources onto a storage device configured for transport to the computer; and
    means for forming the installation package having the selected resources as stored on the storage device using the installer API of the operating system.

10. The apparatus of claim 9, wherein the means for specifying comprises:
    means for sending a request to a remote backup service over a network, the request indicating the selected resources for restoration.

11. The apparatus of claim 10, wherein the means for generating comprises:
   means for generating a restore job at the remote backup service, the restore job specifying a restoration medium of installation package; and
   means for executing the restore job to form the installation package using an installer application programming interface (API) of the operating system.

12. The apparatus of claim 11, wherein the means for providing comprises:
   means for sending the installation package to the computer from the remote backup service over the network.

13. The apparatus of claim 10, wherein the means for generating comprises:
   means for generating a restore job at the remote backup service, the restore job specifying a restoration medium of installation package;
   means for executing the restore job to form the installation package using an installer application programming interface (API) of the operating system;
   means for determining, at the remote backup service, that the installation package exceeds a threshold storage size; and
   means for storing the installation package onto a storage device configured for transport to the computer.

14. The apparatus of claim 9, further comprising:
   means for restricting the installation package to only execute on the operating system and on the computer.

15. The apparatus of claim 9, wherein the means for specifying comprises:
   means for sending a request to a local backup service executing on the computer, the request indicating the selected resources for restoration.

16. The apparatus of claim 15, wherein the means for generating comprises:
   means for generating a restore job specifying a restoration medium of installation package; and
   means for executing the restore job to form the installation package using an installer application programming interface (API) of the operating system.

* * * * *